US009247067B2

(12) United States Patent
Bhow et al.

(10) Patent No.: US 9,247,067 B2
(45) Date of Patent: Jan. 26, 2016

(54) COMMUNICATIONS NETWORK CALL INITIATION TRANSITION

(71) Applicant: Plantronics, Inc., Santa Cruz, CA (US)

(72) Inventors: Gunjan Bhow, Menlo Park, CA (US); Ken Kannappan, Palo Alto, CA (US)

(73) Assignee: Plantronics, Inc., Santa Cruz, CA (US)

( * ) Notice: Subject to any disclaimer, the term of this patent is extended or adjusted under 35 U.S.C. 154(b) by 0 days.

(21) Appl. No.: 14/067,611

(22) Filed: Oct. 30, 2013

(65) Prior Publication Data

US 2014/0057614 A1 Feb. 27, 2014

Related U.S. Application Data

(63) Continuation of application No. 13/081,261, filed on Apr. 6, 2011, now Pat. No. 8,600,030.

(51) Int. Cl.
*H04M 3/42* (2006.01)
*H04M 3/54* (2006.01)
*H04M 1/725* (2006.01)
*H04W 4/16* (2009.01)

(52) U.S. Cl.
CPC .............. *H04M 3/54* (2013.01); *H04M 1/7253* (2013.01); *H04W 4/16* (2013.01); *H04M 2250/02* (2013.01)

(58) Field of Classification Search
USPC ............. 379/211.01, 211.02; 455/414.1, 417, 455/41.1, 41.2, 41.3
See application file for complete search history.

(56) References Cited

U.S. PATENT DOCUMENTS

| | | | |
|---|---|---|---|
| 5,946,386 A * | 8/1999 | Rogers et al. ............ 379/265.09 |
| 7,289,620 B2 * | 10/2007 | Shaffer et al. ............ 379/215.01 |
| 7,424,288 B2 | 9/2008 | Jung et al. |
| 8,116,788 B2 | 2/2012 | Sarkissian et al. |
| 8,121,547 B2 | 2/2012 | Findlay et al. |
| 2003/0003900 A1 | 1/2003 | Gross et al. |
| 2003/0073431 A1 | 4/2003 | Dorenbosch |
| 2008/0089307 A1 * | 4/2008 | Tuijn et al. .................... 370/342 |
| 2008/0220813 A1 | 9/2008 | Brown et al. |
| 2011/0207447 A1 | 8/2011 | Bhow |
| 2012/0005281 A1 | 1/2012 | Winter et al. |
| 2012/0165026 A1 | 6/2012 | Ge et al. |
| 2012/0195420 A1 | 8/2012 | Mahalingam |
| 2012/0231769 A1 | 9/2012 | Sakissian |
| 2013/0210401 A1 * | 8/2013 | Knaz ............................ 455/416 |

* cited by examiner

*Primary Examiner* — Quynh Nguyen
(74) *Attorney, Agent, or Firm* — Chuang Intellectual Property Law

(57) ABSTRACT

Systems and methods for initiating telephony calls are presented. In one example, a phone call initiation is detected on a first communications network. The phone call initiation is redirected to a second communications network. The call is connected utilizing the second communications network.

20 Claims, 5 Drawing Sheets

COMMUNICATIONS NETWORK CALL INITIATION TRANSITION

CROSS REFERENCE TO RELATED APPLICATIONS

This application is a continuation of U.S. patent application Ser. No. 13/081,261, filed Apr. 6, 2011, which is incorporated herein by reference in its entirety.

BACKGROUND OF THE INVENTION

The convergence of computers, voice communications, and the Internet has revolutionized the manner by which people are able to conduct voice communications. People today have the capacity to conduct voice calls using a variety of devices. For example, the use of low cost Voice over Internet Protocol (VoIP) calls has increasingly become available to callers.

Despite the immediate availability and low cost of office telephony systems such as traditional PBX landlines or PC-based telephony, users in an office environment will often use their mobile phone to initiate a call. In many cases the caller does not intend or anticipate leaving the office area during the duration of the call, but still selects to use a mobile phone to initiate the call for any of several reasons, including habit, contact information, phone features, convenience, and preference.

However, mobile calls on cellular networks often have lower audio quality and are typically more expensive than fixed-line office telephony systems. Hence, when available, organizations would prefer their workers use fixed-line office telephony systems rather than mobile phones.

This phenomenon is particularly pronounced for enterprise workers travelling overseas where roaming charges for mobile calls are significant. Often, the worker may use his mobile phone in a circumstance where a VoIP capable PC is within close proximity. These calls unnecessarily incur high mobile roaming and termination charges, and may result in a lower quality call.

As a result, there is a need for improved methods and apparatuses for initiating telephony calls utilizing alternate communication networks.

BRIEF DESCRIPTION OF THE DRAWINGS

The present invention will be readily understood by the following detailed description in conjunction with the accompanying drawings, wherein like reference numerals designate like structural elements.

DESCRIPTION OF SPECIFIC EMBODIMENTS

Figure 1:
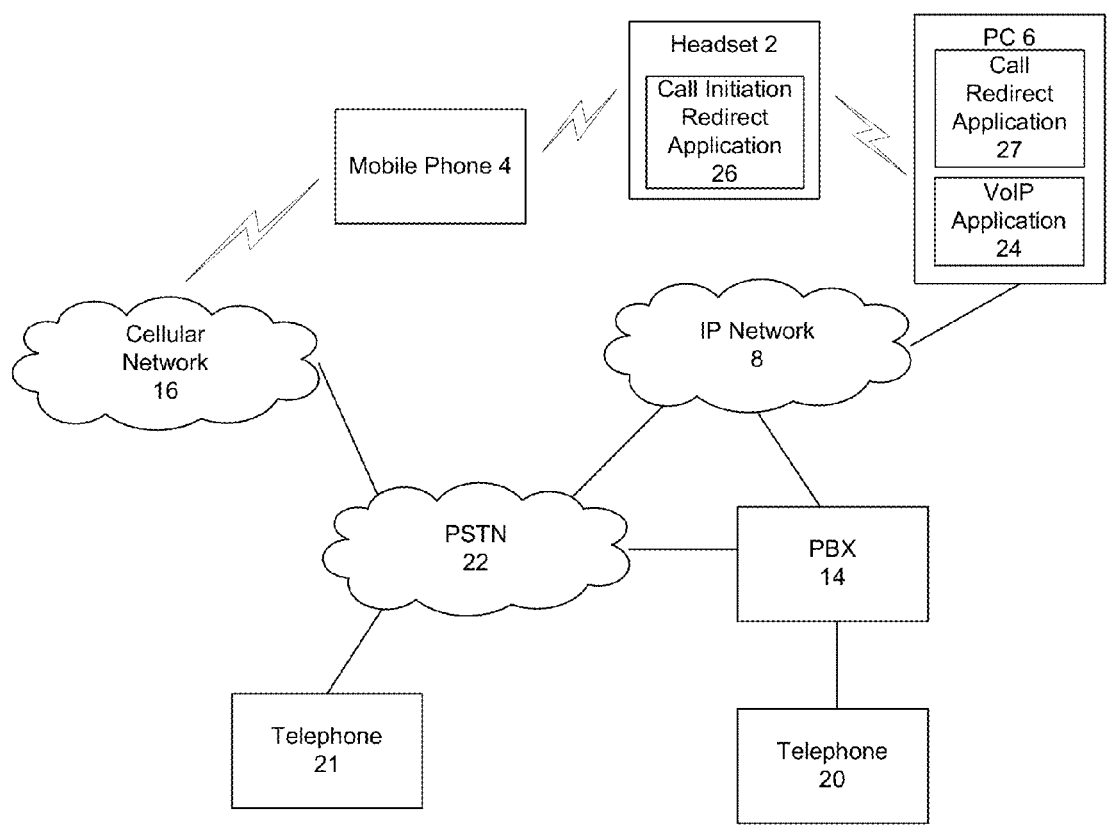
FIG. 1 illustrates a system for call initiation transfer using a headset in one example.

Methods and apparatuses for initiating telephony calls are disclosed. The following description is presented to enable any person skilled in the art to make and use the invention. Descriptions of specific embodiments and applications are provided only as examples and various modifications will be readily apparent to those skilled in the art. The general principles defined herein may be applied to other embodiments and applications without departing from the spirit and scope of the invention. Thus, the present invention is to be accorded the widest scope encompassing numerous alternatives, modifications and equivalents consistent with the principles and features disclosed herein. For purpose of clarity, details relating to technical material that is known in the technical fields related to the invention have not been described in detail so as not to unnecessarily obscure the present invention.

In one example, a method for call initiation includes detecting a phone call initiation on a first communications network, redirecting the phone call initiation to a second communications network, and connecting the call utilizing the second communications network.

In one example, a method for call initiation includes detecting a phone call initiation by a first phone device on a first communications network, redirecting the phone call initiation to a second device operable on a second communications network, and connecting the call utilizing the second communications network.

In one example, a system for call initiation transfer includes a first phone device operable on a first communications network and a second phone device operable on a second communications network. The system further includes a third device configured for communications with the first phone device and the second phone device. The third device is operable to detect a phone call initiation to a desired destination by the first phone device, and the third device is further operable to initiate a call by the second phone device to the desired destination.

In one example, a method for call initiation includes receiving at a body worn device a call initiation indication of an outgoing call to a desired destination initiated by a first phone device operable on a first communications network. Responsive to receiving the call initiation indication, a call initiation instruction is transmitted from the body worn device to a second phone device operable on a second communications network. The call initiation instruction is configured to initiate a call by the second phone device to the desired destination over the second communications network.

In one example, a body worn device includes a wireless transceiver configured for communications with a first phone device and a second phone device. A processing system is configured to detect an outgoing call to a desired destination initiated by the first phone device operable on a first communications network, and initiate a call by the second phone device to the desired destination over a second communications network.

In one example, a system for call initiation transfer includes a mobile phone operable on a cellular communications network and a second phone operable on a second communications network. The system further includes a body worn device such as a headset or other hands-free audio device configured for communications with the mobile phone and the second phone device. The body worn device is operable to detect a phone call initiation to a desired destination by the mobile phone, and the body worn device is further operable to initiate a call by the second phone device to the desired destination. The body worn device is further operable to initiate termination of the phone call to the desired destination by the mobile phone device.

In one example implementation, a headset is connected to office telephony or a VoIP-equipped PC and a mobile phone simultaneously. When the user initiates a call on the mobile phone, the out-call procedure is intercepted by the headset and redirected to the office telephone or VoIP-equipped PC. The call is then initiated by the office telephony or PC instead of the mobile phone. The initial mobile phone call is terminated. Upon initiation of the outgoing call, the VoIP-equipped PC or office telephone may send a confirmation acknowledgement to the headset which may be output as an earcon. Once the outbound call is established, the headset is utilized to conduct the call conversation, with audio transmitted between the headset and the VoIP-equipped PC or office telephone.

Functionality is implemented by firmware or software at the headset, mobile phone, and/or office telephony. The mobile phone may send the call parameters to the headset; in turn the headset forwards the parameters to the office telephony. The call initiation transition can occur automatically or require user approval. Where user approval is required, if the user declines to redirect initiation of the call, the call connection process is allowed to continue at the mobile phone or, if previously terminated, a new call is initiated by the mobile phone using a last number redial command from the headset.

In the case where call parameters are insufficient, the office telephony can prompt the user for more information. For example, local telephone numbers stored in the mobile phone may not contain area codes. Alternatively, the office telephony can use other data to determine the correct telephone number. For example, the mobile phone can forward the caller's last name and a PC (office telephony) can cross-reference the name with an Outlook address book to retrieve the associated dial number.

The systems and methods described herein advantageously synchronizes mobile/office telephony information, combine the features of the mobile phone with the sound quality and connection reliability of a landline, and reduce telephony costs.

FIG. 1 illustrates a system for call initiation transfer using a wireless headset in one example. The system includes a headset 2 operating in multipoint mode paired with both a mobile phone 4 and a telecommunications device such as a personal computer (PC) 6 executing a VoIP application 24 (also referred to herein as a "VoIP telephone" or a "softphone"). In a further example, the system includes a headset 2 operating in multipoint mode paired with both a mobile phone 4 and a telecommunications device such as a "landline" phone connected to a PBX or the PSTN.

Personal computer 6 may, for example, be a notebook computer, desktop computer, or PDA type device. Mobile phone 4 is in wireless communication with cellular network 16, and can initiate outbound calls via the cellular network 16. Mobile phone 4 may receive incoming calls from the public switched telephone network (PSTN) 22 through cellular network 16. A call initiation redirect application 26 residing on headset 2 provides for seamless transition of initiation of call made by a user from mobile phone 4 to initiation of the call by PC 6 such that the call is initiated and subsequently connected using IP network 8 instead of cellular network 16.

Figure 2:
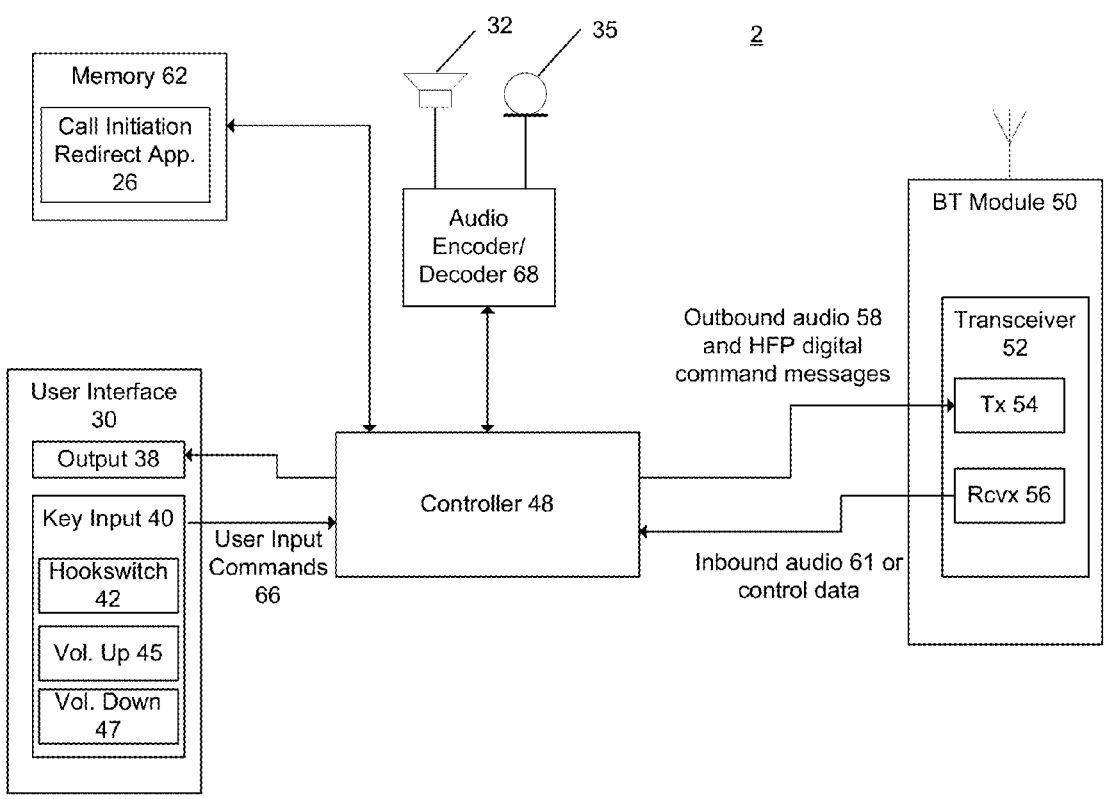
FIG. 2 illustrates a simplified block diagram of the headset shown in FIG. 1 where the headset utilizes the Bluetooth protocol.

FIG. 2 illustrates a simplified block diagram of the headset shown in FIG. 1 where the headset 2 utilizes the Bluetooth wireless protocol. In further examples, other wireless protocols may be utilized, such as IEEE 802.11. For clarity, not all components of the headset 2 are illustrated. The headset 2 includes a Bluetooth module 50, an audio encoder/decoder 68, memory 62, controller 48, user interface 30, speaker 32, and microphone 35. Controller 48 may include a variety of processors, such as digital signal processors.

User interface 30 includes a key input 40. Key input 40 includes a hookswitch function 42, volume up input 45 and volume down input 47. The user interface 30 may also include one or more output interfaces 38 typical to headsets, such as LED indicators or some form of a display. The speaker 32 may also be used as an interface output.

Bluetooth module 50 includes a transceiver 52 having a transmitter 54 and a receiver 56. In one example, Bluetooth module 50 receives and transmits a wireless signal utilizing the Bluetooth protocol Hands-Free Profile. The wireless signal transmitted by transmitter 54 includes outbound audio 58 and Hands-Free Profile command messages received from controller 48. Inbound audio 61 and control data is received by receiver 56 and sent to controller 48. Audio encoder/decoder 68 is used for processing a digital audio signal and an analog audio signal as known in the art.

The Bluetooth transceiver 52 is operable to simultaneously form Bluetooth ACL and SCO links with PC 6 and mobile phone 4. Controller 48 is operable to receive user input commands 130 from user interface 30 and convert these commands to Hands-Free Profile digital command messages. In one example, controller 48 is part of a Bluetooth chip set. These Hands-Free Profile digital command messages are sent to Bluetooth module 50 for wireless transmission using Bluetooth module 50. Controller 48 also receives inbound audio or audio files for output by speaker 32 following decoding by audio encoder/decoder 68. User interface 30 can be any combinations of visual interfaces, tactile interfaces, and/or an audio interface that allow the user to input commands.

Memory 62 stores a call initiation redirect application 26 executed by controller 48 to perform call initiation redirect functions as described herein. Such call initiation redirect functions may be selectively enabled by the headset user. In one example, call initiation redirect occurs automatically when the headset is within range of both mobile phone 4 and PC 6. In a further example, while a call initiation redirect mode is enabled, the user must confirm that a call initiation to PC 6 is desired when an outgoing call made by the user at mobile phone 4 is detected.

In one example, the call initiation redirect application 26 enables the headset 2 to enter a call initiation redirect mode, where during the call initiation mode the headset 2 is configured to detect an outgoing call to a desired destination initiated by the mobile phone 4 operable on cellular network 16. The headset 2 detects the dial number of the desired destination and transmits a make outbound call command to the PC 6, where the command includes the dial number of the desired destination. This command operates to initiate an outbound call by the PC 6 to the desired dial number destination over IP network 8.

In one example, PC 6 includes a PC call redirect application 27 interfacing with VoIP application 24. The PC call redirect application 27 is configured to receive an outbound call command from call initiation redirect application 26 and instruct VoIP application 24 to initiate the outbound call. In one example operation, call initiation redirect application 26 is configured to detect an outgoing mobile call by mobile phone 4. If headset 2 is in a re-direct operation mode (e.g., physically or wirelessly connected to PC call redirect application 27), call initiation redirect application 26 sends instructions to mobile phone 4 to terminate the outgoing call, and sends the dialed digits to PC call redirect application 27. PC call redirect application 27 performs any processing required to translate the received dial digits into a sequence that can be dialed by the VoIP Application 24 to make the outbound call.

In one example, the headset 2 initiates outgoing voice calls by transmitting the dial number (i.e. destination phone number) to a Bluetooth audio gateway at the PC 6. To begin the call set up, headset 2 initiates a Service Level Connection establishment between the headset and the PC 6 and sends a proper ATDdd . . . dd command to the PC 6. The PC 6 then begins the call establishment procedure using the dial number received from headset 2 and issues a +CIEV result code with a value (callsetup=2) to notify the headset 2 that the call set-up has been successfully initiated.

If an audio connection is not already established, the PC 6 establishes the proper audio connection and routes the audio paths of the outgoing call to the headset 2 immediately after commencement of the ongoing call set up procedure. Following call connection, the PC 6 issues a +CIEV result code with a value indicating (call=1).

In one example, once the call is connected by PC 6, the conversation is conducted utilizing the headset 2 over the wireless link between PC 6 and headset 2. Following detection of the outgoing call by mobile phone 4, the call initiation redirect application 26 is further configured to transmit a terminate outbound call command to the mobile phone 4, as the call initiation has been redirected to be made by PC 6. Memory 62 is also used to store digital data, and can take a variety of well known forms, such as flash memory or memory integrated with controller 48.

In one example operation, referring to FIG. 1 and FIG. 2 together, a user of mobile phone 4 may initiate a call using mobile phone 4 over cellular network 16 to a desired call participant at a telephone 21 or a telephone 20. If headset 2 is in range of and in communication with mobile phone 4 and PC 6, the headset 2 operates to transfer initiation of the call on cellular network 16 to initiation of the call on IP network 8. In a further example, headset 2 is paired with mobile phone 4 and detects an outgoing call initiation by mobile phone 4. The headset 2 determines if it is in range with PC 6. If yes, the headset 2 redirects the call initiation to the network on which PC 6 operates. If no, the call connection process by mobile phone 4 continues.

In one example, headset 2 receives a call initiation indication of an outgoing call to telephone 21 or telephone 20 initiated by mobile phone 4 on cellular network 16. Receiving the call initiation indication may include receiving numerical data associated with a dial number for the desired destination of the outgoing call.

Responsive to receiving the call initiation indication, a call initiation instruction is transmitted from the headset 2 to PC 6. The call initiation instruction is configured to instruct PC 6 to initiate a VoIP call over IP network 8 to the desired destination telephone 21 or telephone 20. In addition, headset 2 transmits a call termination instruction to the mobile phone 4 to terminate the detected outgoing call initiated by the mobile phone 4.

In a further example, the user is presented with an option to transfer the call initiation to the PC 6. If the user accepts the call initiation redirect, a call terminate command message is sent by the headset 2 to the mobile phone 4. If the user declines the call initiation redirect, the call is connected on the cellular communications network.

In one example, when the call initiation indication is received, an appropriate communication is output at the headset user interface informing the headset user that the call initiation is being redirected from being made by mobile phone 4 to being made by PC 6. The headset may enter a call initiation redirect mode during which the call by mobile phone 4 is terminated and the call by PC 6 is initiated. In this manner, the call initiation redirect from the mobile phone 4 to PC 6 is seamless and the call participant recipients are not aware of the transfer. The headset user need not perform any actions other than having initiated the call using mobile phone 4.

Figure 3:
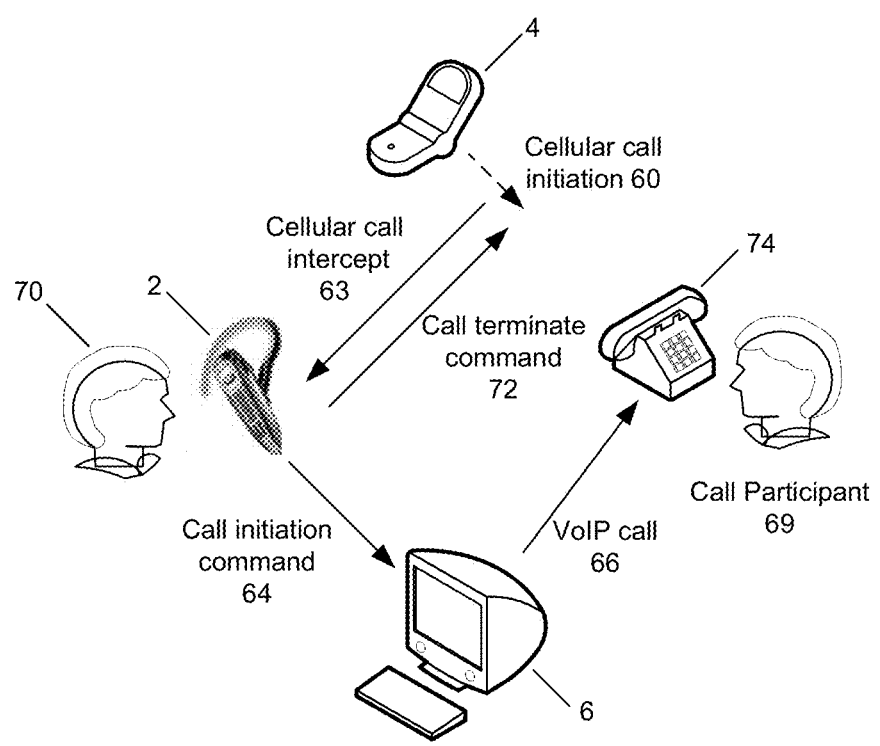
FIG. 3 illustrates the system shown in FIG. 1 in an example usage scenario.

FIG. 3 illustrates the system shown in FIG. 1 in an example usage scenario. In the scenario shown in FIG. 3, a headset wearer 70 using headset 2 is able to form a local wireless link with a mobile phone 4 and a PC 6. The headset 2 is wirelessly paired with the PC 6 and the mobile phone 4 utilizing a wireless communications protocol such as Bluetooth.

In the usage scenario of FIG. 3, headset wearer 70 utilizes mobile phone 4 to initiate a cellular phone call initiation 60 to a call participant 69 at a telephone 74 over a cellular network. The headset 2 operates to perform a cellular call intercept 63 upon detection of the cellular call initiation 60. In one example, as part of cellular call intercept 63, headset 2 is adapted to receive dial data associated with the dialed number of cellular call initiation 60.

Headset 2 transmits a call initiation command 64 with dial data to PC 6. PC 6 is configured to receive the call initiation command 64 and responsively initiate outbound VoIP call 66 to the call participant 69 using an IP network. In one example, PC 6 retrieves additional data stored on PC 6 in order to initiate the call. Headset 2 transmits a call terminate command 72 to mobile phone 4 operable to instruct mobile phone 4 to terminate cellular phone call initiation 60. The headset wearer 82 conducts the outbound call utilizing the headset 2 with the call participant 69 at the telephone 74.

Figure 4:
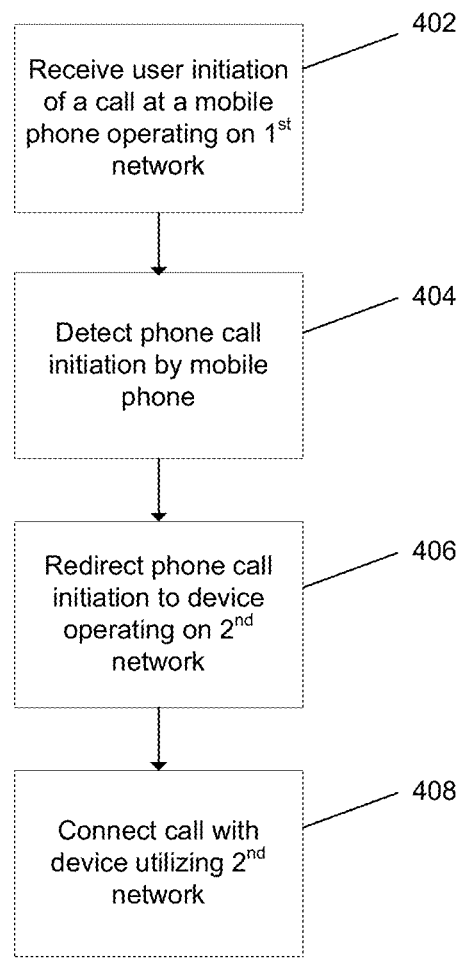
FIG. 4 is a flow diagram illustrating a process for call initiation transfer in one example.

FIG. 4 is a flow diagram illustrating a process for call initiation transfer in one example. At block 402, user initiation of a call at a mobile phone operating on a first network is received. For example, the mobile phone is a wireless cellular mobile phone and the first network is a cellular communications network.

At block 404, the phone call initiation by the mobile phone is detected. At block 406, the phone call initiation is redirected to a device operating on a second network. In one example, the device operating on a second network is a wired device such as a personal computer or a PSTN connected telephone. In one example implementation, redirecting the phone call initiation includes receiving numeric data associated with a dial number and transferring the numeric data to the second device.

At block 408, the call is connected with the device utilizing the second network. In one example, the method further includes terminating the phone call initiation by the first phone device.

Figure 5:
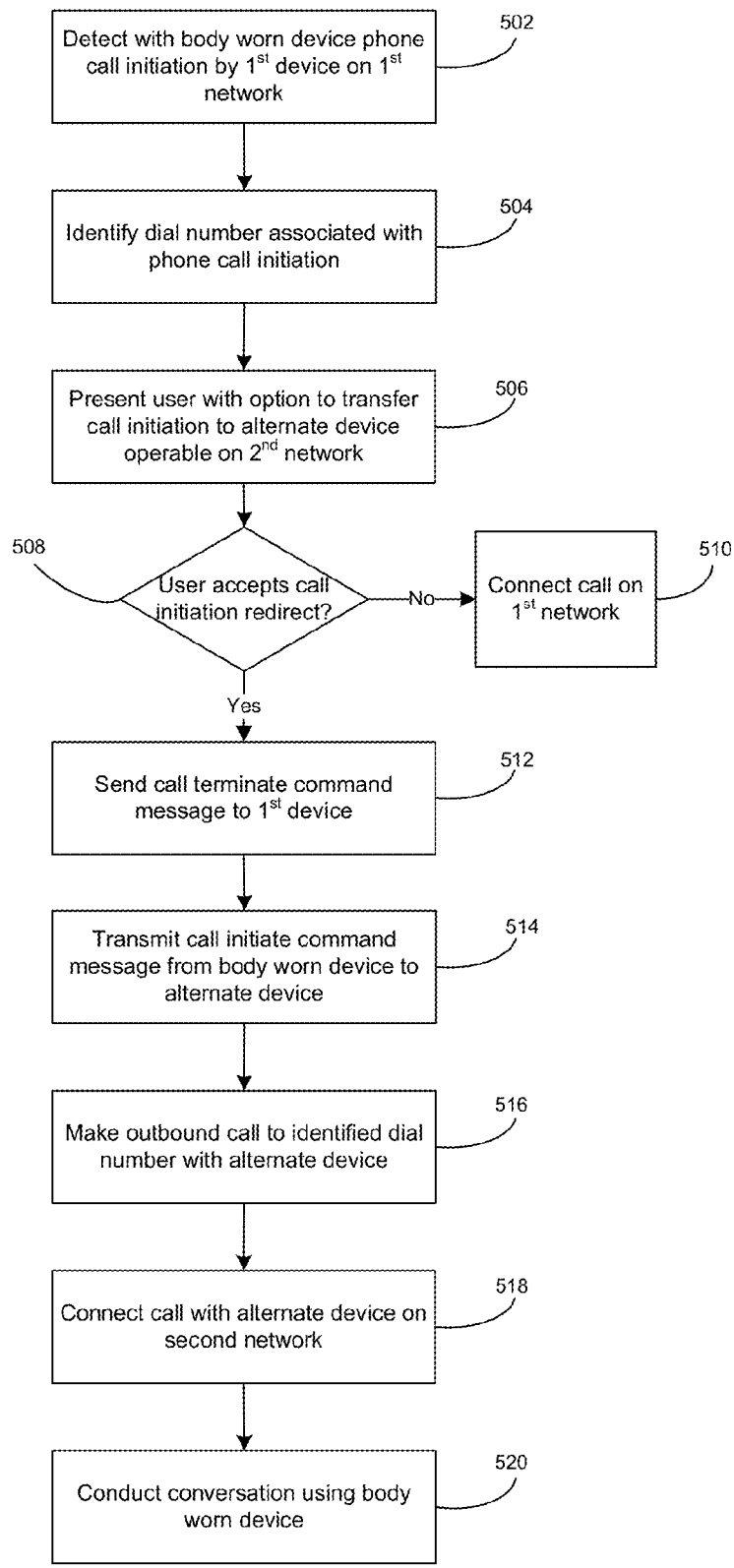
FIG. 5 is a flow diagram illustrating a process for call initiation transfer in a further example.

FIG. 5 is a flow diagram illustrating a process for call initiation transfer in a further example. At block 502, a phone call initiation by a first device on a first communications network is detected by a body worn device. In one example, the first phone device is a mobile cellular phone and the first communications network is a cellular communications network. In one example, the body worn device is a headset previously paired and linked with the first device and an alternate device. At block 504, the dial number associated with the phone call initiation is detected and identified by the body worn device.

At block 506, the user presented with an option to transfer the call initiation to an alternate device so that the call is initiated by the alternate device (i.e., redirect the call initiation) operable on a second communications network. In one example, the alternate device is a networked computer or a PSTN connected telephone. At decision block 508, it is determined whether the user accepts the call initiation redirect. If no at decision block 508, at block 510, the call is connected on the first network.

If yes at decision block 508, at block 512, a call terminate command message is sent by the body worn device to the first device which operates to terminate the phone call initiation by the first device. At block 514, a call initiate command message is sent from the body worn device to the alternate device. The call initiate command message instruction is configured to initiate a call by the alternate device to the desired destination over the second communications network.

At block 516, an outbound call is made to the identified dial number by the alternate device on the second communications network. In one example, the call by the alternate device to the desired destination over the second communications network is a VoIP call made by a computing device. The process further includes transmitting a call termination instruction from the body worn device to the first device configured to terminate the outgoing call to a desired destination initiated by the first device At block 518, the call is connected with the alternate device on the second communications network. At block 520, the call voice conversation is conducted using the body worn device.

While the exemplary embodiments of the present invention are described and illustrated herein, it will be appreciated that they are merely illustrative and that modifications can be made to these embodiments without departing from the spirit and scope of the invention. Thus, the scope of the invention is intended to be defined only in terms of the following claims as may be amended, with each claim being expressly incorporated into this Description of Specific Embodiments as an embodiment of the invention.

What is claimed is:

1. One or more non-transitory computer-readable storage media having computer-executable instructions stored thereon which, when executed by one or more computers, cause the one more computers to perform operations comprising:
   receiving at a wireless communications transceiver of a user device a communication initiation indication of an outgoing communication to a desired destination initiated by a first communication device operable on a first communications network;
   receiving a user instruction to redirect the outgoing communication from the first communications network to a second communications network; and
   transmitting a communication initiation instruction from the user device to a second communication device operable on the second communications network, the communication initiation instruction configured to initiate a communication by the second communication device to the desired destination over the second communications network.

2. The one or more non-transitory computer-readable storage media of claim 1, wherein the operations further comprise presenting to a user an option to transfer the outgoing communication from the first communications network to the second communications network.

3. The one or more non-transitory computer-readable storage media of claim 1, wherein the operations further comprise transmitting a communication termination instruction from the user device to the first communication device configured to terminate the outgoing communication to the desired destination initiated by the first communication device.

4. The one or more non-transitory computer-readable storage media of claim 1, wherein the user device comprises a body worn device.

5. The one or more non-transitory computer-readable storage media of claim 1, wherein the outgoing communication is an outgoing telephony call.

6. The one or more non-transitory computer-readable storage media of claim 1, wherein the user instruction is received at a user interface of the user device.

7. The one or more non-transitory computer-readable storage media of claim 1, wherein the first communication device comprises a first telephony device and the second communication device comprises a second telephony device.

8. A method for outgoing communication initiation comprising:
   detecting an outgoing communication initiation by a first communication device on a first communications network;
   presenting a user selectable option to a user to redirect the outgoing communication initiation from the first communications network to a second communications network, the user selectable option presented to the user subsequent to detecting the outgoing communication initiation; and
   receiving a user action to select the user selectable option; and
   redirecting the outgoing communication initiation to the second communications network.

9. The method of claim 8, wherein the first communication device is a mobile phone and the first communications network is a cellular communications network.

10. The method of claim 8, wherein the outgoing communication initiation is a call.

11. The method of claim 8, wherein the second communications network is an Internet Protocol network.

12. The method of claim 8, further comprising outputting an audible confirmation of redirecting the outgoing communication initiation to the second communications network.

13. A user device comprising:
   a communications interface configured for communications with a first communication device and a second communication device;
   a user interface; and
   a processing system configured to detect an outgoing communication to a desired destination initiated by the first communication device operable on a first communications network and receive a user input action at the user interface to initiate a communication by the second communication device to the desired destination over a second communications network.

14. The user device of claim 13, wherein the communications interface comprises a Bluetooth transceiver.

15. The user device of claim 13, wherein the outgoing communication is an outgoing call.

16. The user device of claim 13, wherein the first communication device is a mobile phone and the second communication device is an office telephone or a VoIP-equipped personal computer.

17. The user device of claim 13, wherein the processing system is further configured to receive a user input action at the user interface to decline a presented request to redirect the outgoing communication to the second communications network.

18. The user device of claim 17, wherein the processing system is further configured to transmit the outgoing communication on the first communications network responsive to the user input action at the user interface to decline the presented request.

19. The user device of claim 13, wherein the first communications network is a cellular communications network and the second communications network is an Internet Protocol network.

20. The user device of claim 13, wherein the processing system is further configured to output at the user interface an audible confirmation of initiation of the communication by the second communication device to the desired destination over the second communications network.

* * * * *